(12) United States Patent
Bak et al.

(10) Patent No.: US 11,729,127 B2
(45) Date of Patent: Aug. 15, 2023

(54) METHODS AND APPARATUSES FOR GENERATING BUNDLE INVITATION LINK FOR PLURALITY OF COMMUNITIES

(71) Applicant: NAVER CORPORATION, Gyeonggi-do (KR)

(72) Inventors: Su Bin Bak, Seongnam-si (KR); Ji Min Yoo, Seongnam-si (KR); Jane Choi, Seongnam-si (KR); Dae Hyun Park, Seongnam-si (KR); Jung Hun Bae, Seongnam-si (KR); Young Ju Kang, Seongnam-si (KR); Sun Mee Kim, Seongnam-si (KR); Ji Hoon Ko, Seongnam-si (KR); Hyo Jong Kim, Seongnam-si (KR); Sang Hoon Lee, Seongnam-si (KR)

(73) Assignee: NAVER CORPORATION, Gyeonggi-Do (KR)

( * ) Notice: Subject to any disclaimer, the term of this patent is extended or adjusted under 35 U.S.C. 154(b) by 0 days.

(21) Appl. No.: 17/369,084

(22) Filed: Jul. 7, 2021

(65) Prior Publication Data
US 2022/0014491 A1 Jan. 13, 2022

(30) Foreign Application Priority Data
Jul. 7, 2020 (KR) .......................... 10-2020-0083441

(51) Int. Cl.
*H04L 51/216* (2022.01)
*G06F 16/955* (2019.01)
*H04L 67/146* (2022.01)

(52) U.S. Cl.
CPC ........ *H04L 51/216* (2022.05); *G06F 16/9558* (2019.01); *H04L 67/146* (2013.01)

(58) Field of Classification Search
CPC ..... H04L 51/16; H04L 51/32; H04L 12/1813; H04L 67/146; G06Q 50/01;
(Continued)

(56) References Cited

U.S. PATENT DOCUMENTS 8,655,672 B2 * 2/2014 Bhan .................. G06Q 10/107
705/1.1
8,745,057 B1 * 6/2014 Li .......................... G06F 16/583
707/737
(Continued)

FOREIGN PATENT DOCUMENTS

KR 10-2013-0082588 A 7/2013
KR 10-1654261 B1 9/2016

OTHER PUBLICATIONS

Korean Office Action dated Dec. 28, 2021 corresponding to KR Patent Application No. 10-2020-0083441.
(Continued)

*Primary Examiner* — Alvin H Tan
(74) *Attorney, Agent, or Firm* — Harness, Dickey & Pierce, P.L.C.

(57) ABSTRACT

Provided are a method and apparatus for generating a bundle invitation link. The method includes obtaining a plurality of invitation links from a first user terminal, each of the plurality of invitation links being connected to at least one community, generating a bundle invitation link connected to a detail page, the detail page including the plurality of invitation links, transmitting the bundle invitation link to a second user terminal, causing a display of the second user terminal to display the detail page in response to receiving, from the second user terminal, an input corresponding to the bundle invitation link, and receiving a data pair from the second user terminal, the data pair including at least one invitation link and an identification value of the second user (Continued)

terminal, and the at least one invitation link being selected from among the plurality of invitation links included in the detail page.

19 Claims, 15 Drawing Sheets

(58) Field of Classification Search
CPC ............ G06Q 10/0631; G06Q 10/101; G06Q 10/103; G06Q 10/1095; G06F 16/9558
See application file for complete search history.

(56) References Cited

U.S. PATENT DOCUMENTS

| | | | | |
|---|---|---|---|---|
| 9,098,805 | B2 * | 8/2015 | Ellis | .................... G07F 17/3211 |
| 10,218,664 | B1 * | 2/2019 | Maczka | ................. H04W 4/14 |
| 2002/0023132 | A1 * | 2/2002 | Tornabene | .......... H04L 12/1818 |
| | | | | 709/205 |
| 2006/0218000 | A1 * | 9/2006 | Smith | .................... G06Q 10/00 |
| | | | | 709/204 |
| 2007/0173325 | A1 * | 7/2007 | Shaw | ...................... A63F 13/86 |
| | | | | 463/42 |
| 2013/0152184 | A1 * | 6/2013 | Wang | .................... G06Q 50/01 |
| | | | | 726/7 |
| 2013/0173729 | A1 | 7/2013 | Starenky et al. | |
| 2016/0105431 | A1 | 4/2016 | Wang et al. | |
| 2018/0183619 | A1 | 6/2018 | Jayaram et al. | |
| 2022/0078587 | A1 | 3/2022 | Lee et al. | |

OTHER PUBLICATIONS

Japanese Office Action dated Apr. 26, 2022 for corresponding JP Patent Application No. 2021-111439.

* cited by examiner

110

METHODS AND APPARATUSES FOR GENERATING BUNDLE INVITATION LINK FOR PLURALITY OF COMMUNITIES

CROSS-REFERENCE TO RELATED APPLICATION

This application is based on and claims priority under 35 U.S.C. § 119 to Korean Patent Application No. 10-2020-0083441, filed on Jul. 7, 2020, in the Korean Intellectual Property Office, the disclosure of which is incorporated by reference herein in its entirety.

BACKGROUND

1. Field

The present disclosure relates to a method and apparatus for generating a bundle invitation link for a plurality of communities. More particularly, the present disclosure relates to a method and apparatus for generating, in a bundle, a plurality of invitation links for joining a plurality of communities.

2. Description of the Related Art

This section provides background information related to the present disclosure which is not necessarily prior art.

A user may join a community for exchanging information on a network, via a certain procedure. With the development of Internet technology, various types of communities are being formed, and accordingly, there is inconvenience in that a user performs a joining procedure for each of a plurality of communities.

Meanwhile, to recommend another user to join a specific community, an invitation link connected to the specific community is generated. In this case, an invitation link is generated for each of a plurality of communities, and thus it is difficult to manage a plurality of invitation links.

The aforementioned background technology is technical information possessed or acquired by the inventors, and is not necessarily prior art disclosed to the public before the application of the present disclosure.

SUMMARY

This section provides a general summary of some example embodiments, and is not a comprehensive disclosure of the full scope or all features of some example embodiments.

Some example embodiments of the present disclosure provide a method and apparatus for generating a bundle invitation link for joining a plurality of communities via a minimum, or low, user input.

Additional aspects will be set forth in part in the description which follows and, in part, will be apparent from the description, or may be learned by practice of some example embodiments.

According to some example embodiments of the present disclosure, a method for generating a bundle invitation link includes obtaining a plurality of invitation links from a first user terminal, each of the plurality of invitation links being connected to at least one community, generating a bundle invitation link connected to a detail page, the detail page including the plurality of invitation links, transmitting the bundle invitation link to a second user terminal, causing a display of the second user terminal to display the detail page in response to receiving, from the second user terminal, an input corresponding to the bundle invitation link, and receiving a data pair from the second user terminal, the data pair including at least one invitation link and an identification value of the second user terminal, and the at least one invitation link being selected from among the plurality of invitation links included in the detail page.

The obtaining of the plurality of invitation links may include receiving, from the first user terminal, an identification value of the first user terminal, determining whether the first user terminal has an invitation link generation authority for each invitation link among a set of invitation links based on the identification value of the first user terminal, and obtaining the plurality of invitation links for which the first user terminal has the invitation link generation authority from among the set of invitation links.

The obtaining the plurality of invitation links for which the first user terminal has the invitation link generation authority may include transmitting, to the first user terminal, a subset of invitation links among the set of invitation links for which the first user terminal has the invitation link generation authority, and obtaining the plurality of invitation links from the first user terminal based on a selection of the plurality of invitation links from among the subset of invitation links.

The detail page may include a plurality of joining user interface (UI) objects corresponding to the plurality of invitation links, and the receiving the data pair may include receiving the data pair based on a selection of at least one of the plurality of joining UI objects, the at least one invitation link corresponding to the selected at least one joining UI object.

The detail page may include a plurality of selection UI objects and a joining UI object, the plurality of selection UI objects corresponding to the plurality of invitation links, and the receiving the data pair may include receiving the data pair based on a selection of the joining UI object and at least one of the plurality of selection UI objects.

The receiving of the data pair may include determining whether the second user terminal is able to join the at least one invitation link based on user information obtained from the second user terminal, and receiving the data pair based on determining that the second user terminal is able to join the at least one invitation link and a selection of the joining UI object.

The causing the display of the second user terminal to display the detail page may include disabling an invitation link among the plurality of invitation links that the second user terminal is unable to join based on user information obtained from the second user terminal, and the detail page may include the disabled invitation link.

The method may further include receiving modification data from the first user terminal, the modification data corresponding to the bundle invitation link, editing the detail page based on the modification data, and causing the display of the second user terminal to display the edited detail page in response to re-receiving, from the second user terminal, the input corresponding to the bundle invitation link.

The method may further include receiving modification data from the first user terminal, the modification data corresponding to the bundle invitation link, editing the detail page based on the modification data, generating a new bundle invitation link connected to the edited detail page, transmitting the new bundle invitation link to the second user terminal, and causing the display of the second user terminal to display the edited detail page in response to receiving, from the second user terminal, an input corresponding to the new bundle invitation link.

According to some example embodiments of the present disclosure, an apparatus for generating a bundle invitation link includes at least one processor configured to cause the apparatus to obtain a plurality of invitation links from a first user terminal, each of the plurality of invitation links being connected to at least one community, generate a bundle invitation link connected to a detail page, the detail page including the plurality of invitation links, transmit the bundle invitation link to a second user terminal, cause a display of the second user terminal to display the detail page in response to receiving, from the second user terminal, an input corresponding to the bundle invitation link, and receive a data pair from the second user terminal, the data pair including at least one invitation link and an identification value of the second user terminal, and the at least one invitation link being selected from among the plurality of invitation links included in the detail page.

The at least one processor may be configured to cause the apparatus to receive an identification value of the first user terminal from the first user terminal, determine whether the first user terminal has an invitation link generation authority for each invitation link among a set of invitation links based on the identification value of the first user terminal, and obtain the plurality of invitation links for which the first user terminal has the invitation link generation authority from among the set of invitation links.

The at least one processor may be configured to cause the apparatus to transmit, to the first user terminal, a subset of invitation links among the set of invitation links for which the first user terminal has the invitation link generation authority, and obtain the plurality of invitation links from the first user terminal based on a selection of the plurality of invitation links from among the subset of invitation links.

The detail page may include a plurality of joining user interface (UI) objects corresponding to the plurality of invitation links, and the at least one processor may be configured to cause the apparatus to receive the data pair based on a selection of at least one of the plurality of joining UI objects, the at least one invitation link corresponding to the selected at least one joining UI object.

The detail page may include a plurality of selection UI objects and a joining UI object, the plurality of selection UI objects corresponding to the plurality of invitation links, and the at least one processor may be configured to cause the apparatus to receive the data pair based on a selection of the joining UI object and at least one of the plurality of selection UI objects.

The at least one processor may be configured to cause the apparatus to determine whether the second user terminal is able to join the at least one invitation link based on user information obtained from the second user terminal, and receive the data pair based on determining that the second user terminal is able to join the at least one invitation link and a selection of the joining UI object.

The at least one processor may be configured to cause the apparatus to disable an invitation link among the plurality of invitation links that the second user terminal is unable to join based on user information obtained from the second user terminal, and the detail page may include the disabled invitation link.

The at least one processor may be configured to cause the apparatus to receive modification data from the first user terminal, the modification data corresponding to the bundle invitation link, edit the detail page based on the modification data, and cause the display of the second user terminal to display the edited detail page in response to re-receiving, from the second user terminal, the input corresponding to the bundle invitation link.

The at least one processor may be configured to cause the apparatus to receive modification data from the first user terminal, the modification data corresponding to the bundle invitation link, edit the detail page based on the modification data, generate a new bundle invitation link connected to the edited detail page, transmit the new bundle invitation link to the second user terminal, and cause the display of the second user terminal to display the edited detail page in response to receiving, from the second user terminal, an input corresponding to the new bundle invitation link.

According to some example embodiments of the present disclosure, a non-transitory computer-readable medium stores a computer program that, when executed by a computer, causes the computer to execute the method.

According to some example embodiments, the method may include registering the second user terminal with one or more communities among the at least one community connected to the at least one invitation link.

Other aspects, features, and advantages may become clear from the following drawings, the claims, and the detailed description of the present disclosure.

BRIEF DESCRIPTION OF THE DRAWINGS

Some example embodiments will be described in more detail with regard to the figures, wherein like reference numerals refer to like parts throughout the various figures unless otherwise specified, and wherein.

Figure 1:
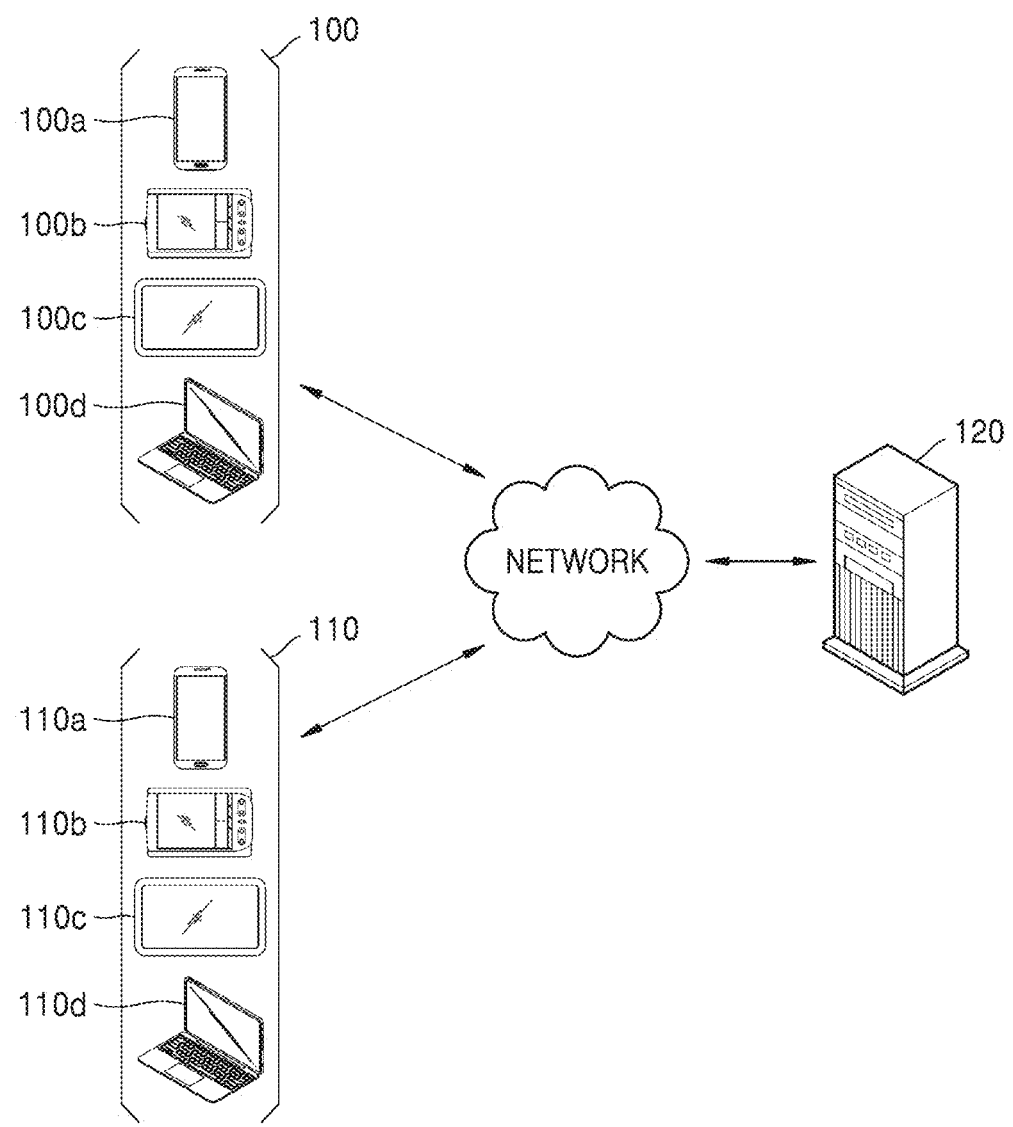
FIG. 1 is a diagram showing an example of a system for generating a bundle invitation, the system including a method for generating a bundle invitation link, according to some example embodiments of the present disclosure.

It should be noted that these figures are intended to illustrate the general characteristics of methods and/or structures utilized in some example embodiments and to supplement the written description provided below. These drawings are not, however, to scale and may not precisely reflect the precise structural or performance characteristics of some example embodiments, and should not be interpreted as defining or limiting the range of values or properties encompassed by some example embodiments.

DETAILED DESCRIPTION

Some example embodiments will be described in detail with reference to the accompanying drawings. Some example embodiments, however, may be embodied in various different forms, and should not be construed as being limited to only the illustrated examples. Rather, the illustrated examples are provided so that this disclosure will be thorough and complete, and will fully convey the concepts of this disclosure to those of ordinary skill in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, operations, elements, and/or components, but do not preclude the presence or addition of one or more other features, integers, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element, there are no intervening elements present.

Unless otherwise defined, all terms (including technical and scientific terms) used herein have the same meaning as, or a similar meaning to, that commonly understood by one of ordinary skill in the art to which some example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Some example embodiments may be described with reference to acts and symbolic representations of operations (e.g., in the form of flowcharts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously or contemporaneously, or in some cases be performed in reverse order.

Units and/or devices according to some example embodiments may be implemented using hardware, software, and/or a combination thereof. For example, hardware devices may be implemented using processing circuitry such as, but not limited to, at least one processor, a central processing unit (CPU), a controller, an arithmetic logic unit (ALU), a digital signal processor, a microcomputer, a field programmable gate array (FPGA), a system-on-chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher-level program code that is executed using an interpreter.

For example, when a hardware device is a computer processing device (e.g., a processor, a CPU, a controller, an ALU, a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer-readable recording media, including tangible or non-transitory computer-readable storage media discussed herein.

According to some example embodiments, computer processing devices may be described as including various functional units that perform various operations and/or functions to increase the clarity of the description. However, computer processing devices are not intended to be limited to these functional units. For example, in some example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to some example embodiments may also include one or more storage devices. The one or more storage devices may be tangible or non-transitory computer-readable storage media, such as random-access memory (RAM), read only memory (ROM), a permanent mass storage device (such as a disk drive), solid-state (e.g., NAND flash) device, and/or any other like data storage mechanism capable of storing and recording data. The one or more storage devices may be configured to store computer programs, program code, instructions, or some combination thereof, for one or more operating systems and/or for implementing some example embodiments described herein. The computer programs, program code, instructions, or some combination thereof, may also be loaded from a separate computer-readable storage medium into the one or more storage devices and/or one or more computer processing devices using a drive mechanism. Such a separate computer-readable storage medium may include a universal serial bus (USB) flash drive, a memory stick, a Blu-ray/DVD/CD-ROM drive, a memory card, and/or other similar computer-readable storage media. The computer programs, program code, instructions, or some combination thereof, may be loaded into the one or more storage devices and/or the one or more computer processing devices from a remote data storage device via a network interface, rather than via a local computer-readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other similar medium.

The one or more hardware devices, the one or more storage devices, and/or the computer programs, program code, instructions, or some combination thereof, may be specially designed and constructed for some example embodiments, or they may be known devices that are altered and/or modified for some example embodiments.

A hardware device, such as a computer processing device, may run an operating system (OS) and one or more software applications that run on the OS. The computer processing device also may access, store, manipulate, process, and create data in response to execution of the software. For simplicity, some example embodiments may be exemplified as one computer processing device; however, one of ordinary skill in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of some example embodiments may be variously made according to the description by those of ordinary skill in the art. For example, the described techniques may be performed in an order different to that of the methods described, and/or components such as the described system, architecture, devices, circuit, and the like, may be connected or combined to be different from the above-described methods, or results may be appropriately achieved by other components or equivalents.

The detailed description of the present disclosure to be described below refers to the accompanying drawings, which illustrate some example embodiments in which the present disclosure may be practiced. Some example embodiments are described in sufficient detail to enable one of ordinary skill in the art to practice the present disclosure. It is to be understood that some example embodiments of the present disclosure are different from each other, but need not be mutually exclusive. For example, specific shapes, structures, and characteristics described herein may be changed and implemented without departing from the spirit and scope of the present disclosure. In addition, it should be understood that positions or arrangements of individual elements in some example embodiments may be changed without departing from the spirit and scope of the present disclosure. Accordingly, the detailed description described below is not implemented in a limiting sense, and the scope of the present disclosure may encompass the scope claimed by claims and all scopes equivalent thereto. In drawings, the like reference numerals denote the same or similar elements over various aspects.

Hereinafter, some example embodiments of the present disclosure will be described in detail with reference to accompanying drawings to enable one of ordinary skill in the art to easily execute the present disclosure.

FIG. 1 is a diagram showing an example of a system for generating a bundle invitation, the system including a method for generating a bundle invitation link, according to some example embodiments of the present disclosure.

The system of FIG. 1 includes a plurality of user terminals 100a through 100d and 110a through 110d, a server 120 for generating a bundle invitation link, and/or a network. FIG. 1 is an example for describing the present disclosure and the number of user terminals, and/or the number of servers, is not limited to that shown in FIG. 1.

The plurality of user terminals 100a through 100d and 110a through 110d may each be a fixed terminal or a mobile terminal implemented as a computing device. Examples of each of the plurality of user terminals 100a through 100d and 110a through 110d include a smartphone, a mobile phone, a navigation device, a computer, a laptop computer, a digital broadcasting terminal, a personal digital assistant (PDA), a portable multimedia player (PMP), a tablet personal computer (PC), etc. In detail, the system according to some example embodiments of the present disclosure may include the server 120, a first user terminal 100 for generating a bundle invitation link, and a second user terminal 110 for receiving a bundle invitation link. For example, the first user terminal 100 may communicate with the other user terminals 110a through 110d, and/or the server 120, via the network by using a wireless and/or wired communication method.

The server 120, the first user terminal 100, and the second user terminal 110 may communicate with each other via the network. A communication method is not limited and may include not only a communication method using a communication network (for example, a mobile communication network, wired Internet, wireless Internet, or a broadcasting network) that may be included in the network, but also short-range wireless communication between devices. For example, the network may include one or more networks such as a personal area network (PAN), a local area network (LAN), a campus area network (CAN), a metropolitan area network (MAN), a wide area network (WAN), a broadband network (BBN), and/or the Internet. Also, the network may include one or more of network topologies including a bus network, a start network, a ring network, a mesh network, a star-bus network, and/or a tree or hierarchical network, but is not limited thereto.

User terminals according to some example embodiments of the present disclosure may join a community connected to an invitation link, by using the invitation link. According to some example embodiments, when the user terminal is to join a plurality of communities, the user terminal may use a plurality of invitation links respectively connected to the plurality of communities, or may use a bundle invitation link according to some example embodiments of the present disclosure. According to some example embodiments, the bundle invitation link may be generated by using a plurality of invitation links.

According to some example embodiments of the present disclosure, formats of the plurality of invitation links and bundle invitation link are not limited. For example, the plurality of invitation links and bundle invitation link may be generated in forms of images, moving images, or text, and may be shared via separate applications, such as an email, a messenger, or various social network services (SNSs).

According to some example embodiments, the first user terminal 100 and the second user terminal 110 may transmit or receive the bundle invitation link to or from the server 120. For example, the first user terminal 100 may transmit the bundle invitation link and the second user terminal 110 may receive the bundle invitation link. However, some example embodiments are not limited thereto, and the system may transmit and receive the bundle invitation link to and from one user terminal. In other words, it should be noted that a user terminal transmitting a bundle invitation link and a user terminal receiving a bundle invitation link are not necessarily configured of separate pieces of hardware.

According to some example embodiments, when a user input of selecting a bundle invitation link is received from a user terminal, a detail page connected to the bundle invitation link may be output on a display of the user terminal. The detail page may display a plurality of invitation links, and a user may select each of the plurality of invitation links. This will be described in detail below with reference to a related drawing.

According to some example embodiments, the server 120 may receive information related to the generated bundle invitation link from the first user terminal 100 via the network. Also, the server 120 may receive, from the first user terminal 100, modification data regarding the bundle invitation link, and then, in response to receiving a user input regarding the bundle invitation link from the second user terminal 110, transmit, to the second user terminal 110, the bundle invitation link to which the modification data is reflected. This will be described in detail with reference to FIGS. 5 and 6.

Figure 2:
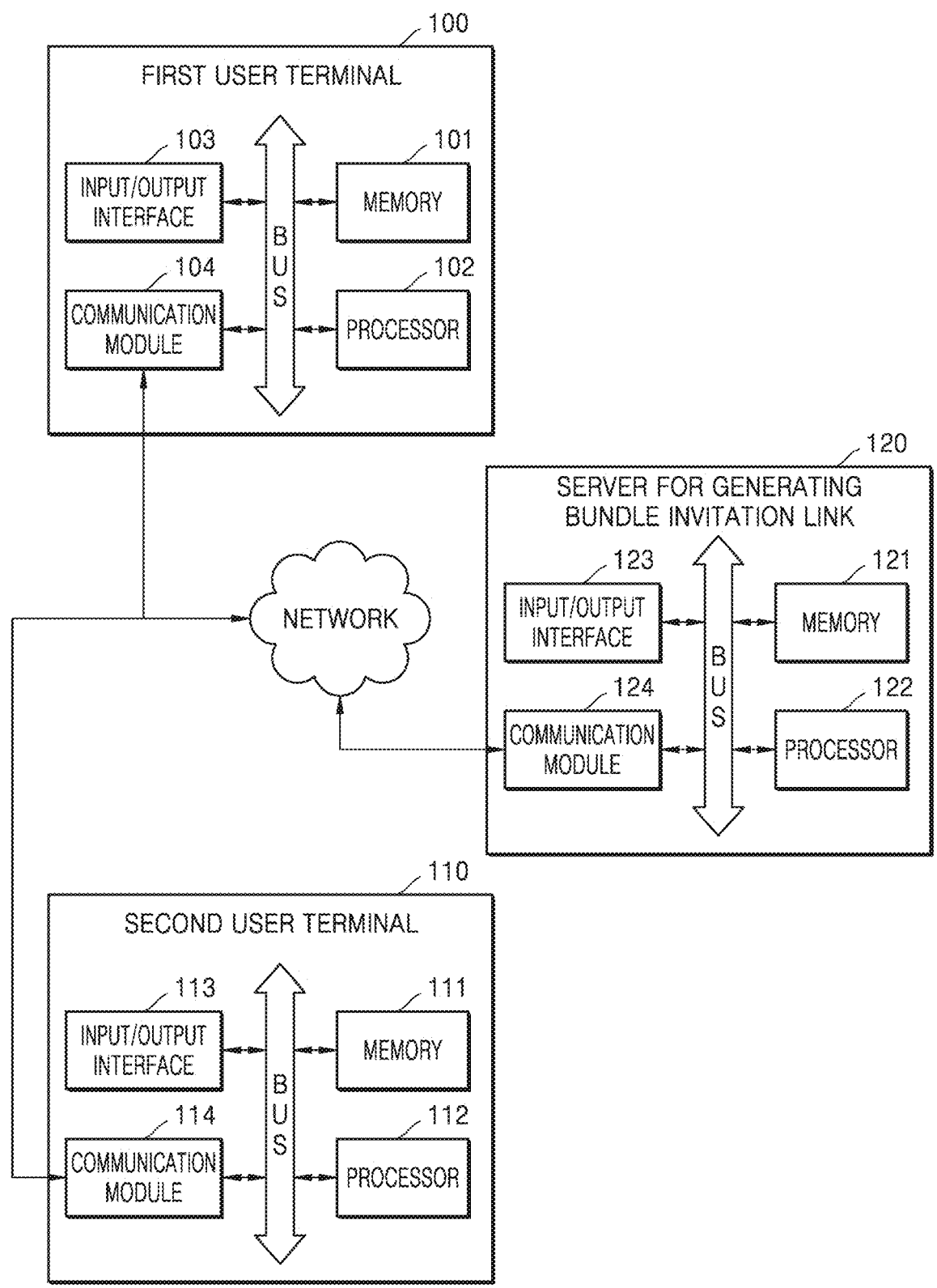
FIG. 2 is a block diagram for describing internal configurations of user terminals and a server for performing a method of generating a bundle invitation link, according to some example embodiments of the present disclosure.

FIG. 2 is a block diagram for describing internal configurations of the first and second user terminals 100 and 110, and the server 120 for performing a method of generating a bundle invitation link, according to some example embodiments of the present disclosure.

According to some example embodiments, the first user terminal 100, the second user terminal 110, and the server 120 for generating a bundle invitation link may include memories 101, 111, and 121, processors 102, 112, and 122, input/output interfaces 103, 113, and 123, and/or communication modules 104, 114, and 124, respectively. The memories 101, 111, and 121 are computer-readable recording media, and may include random access memory (RAM), read-only memory (ROM), and/or a permanent mass storage device such as a disk drive. For example, the memory 101 may temporarily or permanently store invitation link information, program code and configuration (e.g., configuration data) for controlling the first user terminal 100.

The processors 102, 112, and 122 may be configured to process an instruction of a computer program by performing basic arithmetic, logic, and input/output operations. The instruction may be provided to the processors 102, 112, and 122 by the memories 101, 111, and 121 or the communication modules 104, 114, and 124. For example, the processors 102, 112, and 122 may be configured to execute a received instruction according to program code stored in recording devices, such as the memories 101, 111, and 121. The processor 122 of the server 120 according to some example embodiments may obtain, from the first user terminal 100, a plurality of invitation links each connected to at least one community and generate a bundle invitation link connected to a detail page where the plurality of invitation links are displayed. Then, the processor 122 may transmit the bundle invitation link to the second user terminal 110. Also, the processor 122 may display (e.g., may cause the processor 112 of the second user terminal 110 to display) the detail page on a display of the second user terminal 110, in response to receiving a user input regarding the bundle invitation link from the second user terminal 110. Also, in response to a user input of selecting at least one of the plurality of invitation links included in the detail page, the processor 122 may receive, from the second user terminal 110, a data pair including the selected at least one invitation link and an identification value of the second user terminal 110.

The communication modules 104, 114, and 124 may provide a function for communicating with the server 120, via a network. For example, a request generated by the processor 102 of the first user terminal 100 according to program code stored in a recording medium, such as the memory 101, may be transmitted to the server 120 through the network, according to a control of the communication module 104. According to some example embodiments, a control signal, instruction, content, file, or the like provided according to a control of the processor 122 of the server 120 may be transmitted to the second user terminal 110 via the communication module 114 through the network. For example, the control signal or instruction of the server 120 received via the communication module 114 of the second user terminal 110 may be transmitted to the processor 112 or the memory 111, and the content or file may be stored in a storage medium that may be further included in the second user terminal 110.

The communication modules 104, 114, and 124 may communicate with each other via the network. A communication method is not limited, but the network may be a short-range wireless communication network. For example, the network may be a Bluetooth, Bluetooth low energy (BLE), or Wi-Fi communication network.

The input/output interfaces 103, 113, and 123 may be a unit for an interface with an input/output device. For example, an input device may include a device such as a keyboard or a mouse, and an output device may include a device such as a display for displaying a communication session of an application. As another example, the input/output interfaces 103, 113, and 123 may be a unit for an interface with a device in which functions for input and output are integrated, such as a touch screen. In detail, with respect to the processor 102 of the first user terminal 100 processing an instruction of a computer program loaded on the memory 101, a service screen or content configured by using data provided by the server 120 or second user terminal 110 may be displayed on a display via the input/output interface 103.

According to some example embodiments, the first user terminal 100, the second user terminal 110, and the server 120 may include more components than those shown in FIG. 2. However, some components of the related art are not illustrated in detail. For example, the first user terminal 100 and second user terminal 110 may each include a battery or charging device for supplying power to components therein, may be implemented to include at least a part of the input/output device, or may further include other component, such as a transceiver, a global positioning system (GPS) module, various sensors, and/or a database.

Figure 3:
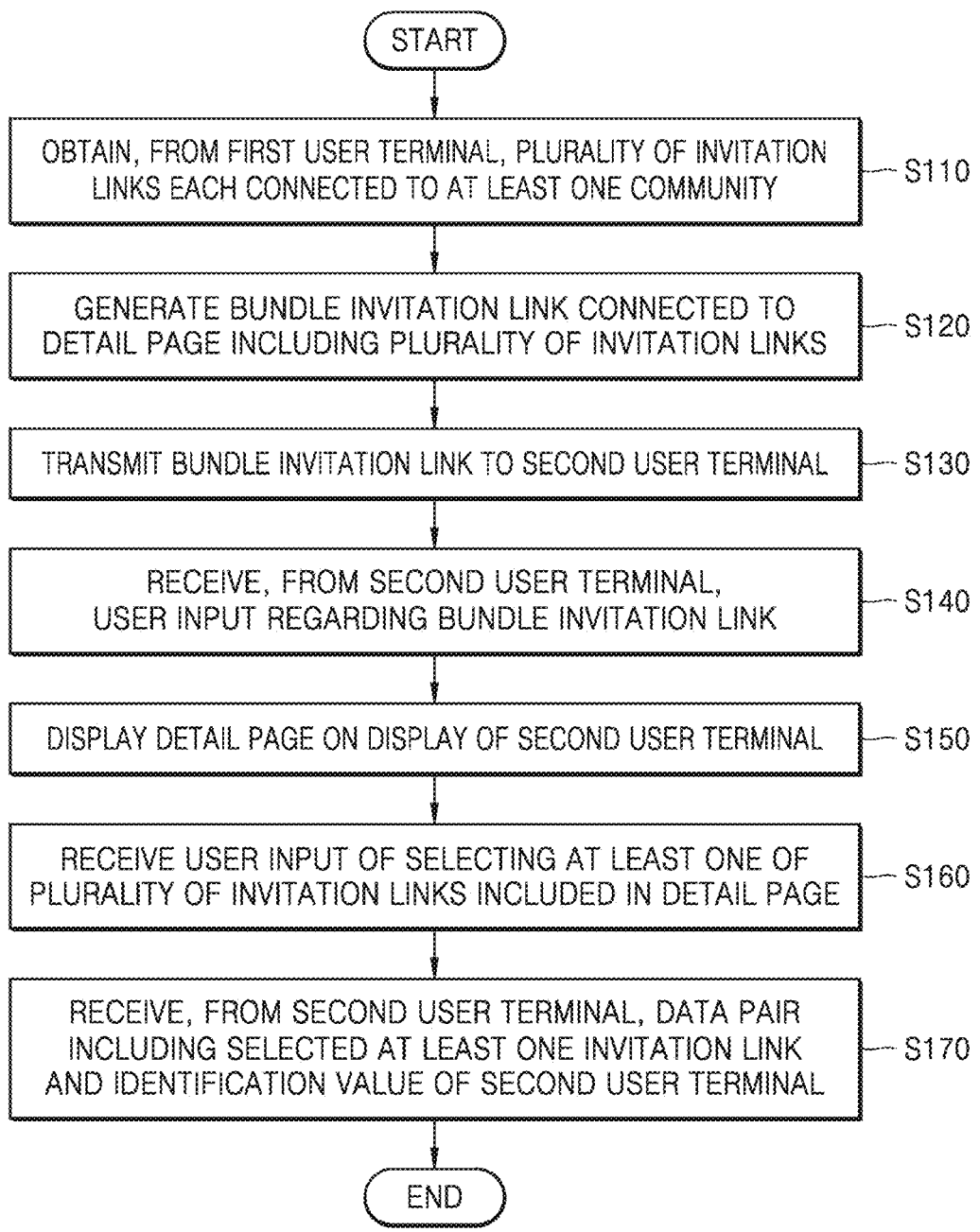
FIG. 3 is a flowchart of a method of generating a bundle invitation link, wherein operations of the method are illustrated in a time-series order, according to some example embodiments of the present disclosure.

FIG. 3 is a flowchart of a method of generating a bundle invitation link, wherein operations of the method are illustrated in a time-series order, according to some example embodiments of the present disclosure.

As described above, a system for generating a bundle invitation link, according to some example embodiments, may include user terminals and a server for generating a bundle invitation link. The method described below is performed by the server, but according to some example embodiments of the present disclosure, not all operations of the method are performed by the server, and at least one operation may be performed by the user terminal (e.g., one or more of the user terminals). Hereinafter, for clear description of the present disclosure, an operating subject of the method is described to be an electronic device. As described above, the electronic device may be the server 120 or an external server connected via a network. A specific operating subject of each operation will be described in detail below with reference to FIG. 4.

In operation S110, the electronic device may obtain, from a first user terminal (e.g., the first user terminal 100), a plurality of invitation links each connected to at least one community. According to some example embodiments, a user terminal that generates a bundle invitation link may possess assigned authority. According to some example embodiments, the user terminal may be assigned authority for all of a plurality of invitation links included in the bundle invitation link, generation authority for at least one of the plurality of invitation links, or separate authority for generating the bundle invitation link. For example, a user terminal having invitation link generation authority for some of a plurality of invitation links may generate a bundle invitation link including only the invitation links for which the user terminal has the invitation link generation authority.

Accordingly, the electronic device according to some example embodiments of the present disclosure may further receive, from the first user terminal, an identification value of the first user terminal (e.g., a identifier of the first user terminal, an account identifier of a user of the first user terminal, etc.) together with the plurality of invitation links. Then, the electronic device may determine presence of invitation link generation authority of the first user terminal for each of the plurality of invitation links (e.g., a set of invitation links), by using the identification value of the first user terminal, and select only an invitation link (or a plurality of invitation links) with the invitation link generation authority of the first user terminal from among the plurality of invitation links. According to some example embodiments, each community may be a group of users able to exchange information (e.g., messages, such as instant messages or posts displayed on a community page/portal, documents, images, videos, etc.) on a network (e.g., on a platform such as a website, SNS, application, etc.). According to some example embodiments, each invitation link causes relevant information to be provided to the community (e.g., the community page/portal) for registration of a user, or provides a respective user terminal access to (e.g., re-directs the respective user terminal to) the community (e.g., the community page/portal) for registering the user, in response to a selection of the invitation link at the respective user terminal. According to some example embodiments, the bundle invitation link is a single link that provides a respective user terminal access to (e.g., re-directs the respective user terminal to) a detail page including a plurality of invitation links (discussed further below). According to some example embodiments, each community may grant invitation link generation authority for the community to one or more user terminals. According to some example embodiments, identity information for user terminals having invitation link generation authority for each community is stored at the electronic device (e.g., in a table in which respective identity information is stored in association with each corresponding community).

Next, the electronic device according to some example embodiments may further receive a selection of the first user terminal regarding the plurality of invitation links with the invitation link generation authority (e.g., for which the first user terminal has the invitation link authority). Accordingly, a user of the first user terminal may select some invitation links to be included in the bundle invitation link from among the plurality of invitation links (e.g., a subset of invitation links from among the set of invitation links) with the invitation link generation authority. According to the some example embodiments, the electronic device may transmit, to the first user terminal, the invitation link(s) with the invitation link generation authority of the first user terminal from among the plurality of invitation links, and when a user input of selecting the invitation link(s) with respect to the first user terminal is received, obtain the selected invitation link(s) (e.g., a plurality of invitation links) from the first user terminal.

In operation S120, the electronic device may generate a bundle invitation link connected to a detail page where the plurality of invitation links are displayed. According to some example embodiments, the electronic device may generate the detail page connected to the bundle invitation link and output the detail page (e.g., cause the detail page to be output) on a display of a user terminal. The detail page may be generated in a format of a webpage, and may be overlaid on an application pre-output, or output, on the display of the user terminal. Some example embodiments are not limited thereto, and a separate application may be invoked and the detail page may be output on the separate application. A configuration and form of the detail page will be described in detail below with reference to FIGS. 11 and 12.

In operation S130, the electronic device may transmit the bundle invitation link to a second user terminal (e.g., the second user terminal 110). According to some example embodiments, the electronic device may transmit the bundle invitation link to the second user terminal, based on an instruction transmitted from the first user terminal. According to some example embodiments, the first user terminal may transmit the bundle invitation link to the second user terminal via a network. In this case, the first user terminal may receive the generated bundle invitation link from the electronic device and directly transmit the bundle invitation link to the second user terminal. According to some example embodiments, the electronic device or the first user terminal may transmit the bundle invitation link in response to a bundle invitation link request signal of the second user terminal.

In operation S140, the electronic device may receive, from the second user terminal, an input (e.g., a user input) regarding the bundle invitation link. According to some example embodiments, the bundle invitation link may be output on a display of the second user terminal that received the bundle invitation link, in any one of various forms. According to some example embodiments of the present disclosure, formats of the plurality of invitation links and bundle invitation link are not limited. For example, the plurality of invitation links and bundle invitation link may be generated in forms of images, moving images, and/or text, and may be shared via separate applications, such as an email, a messenger, and/or various SNSs.

For example, when the bundle invitation link generated in a form of text is transmitted to the second user terminal via an SNS, the user may select the bundle invitation link shared on the SNS.

In operation S150, the electronic device may display the detail page (e.g., cause the detail page to be displayed on) on the display of the second user terminal. When the second user terminal receives an input (e.g., a user input) regarding the bundle invitation link, the second user terminal may transmit, to the electronic device, a request signal for the detail page connected to the bundle invitation link. Then, the electronic device may transmit, to the second user terminal, information related to the detail page connected to the bundle invitation link. In this case, the second user terminal may output the detail page on an uppermost layer of the display or may output the detail page in a region of a separate application by invoking the separate application.

According to some example embodiments, the electronic device may obtain user information of the second user terminal (e.g., an identifier of the second user terminal, an account identifier of a user of the second user terminal, a list of communities that the user of the second user terminal is unable to access, etc.), and modify a configuration of the detail page connected to the bundle invitation link, based on the obtained user information. For example, the electronic device may modify the detail page such that an invitation link connected to a community that is unable for the second user terminal to join is unable to be selected. In some example embodiments, the electronic device may disable the invitation link that is unable for the second user terminal to join, based on the user information obtained from the second user terminal. In this case, the detail page including the disabled invitation link may be output on the display of the second user terminal that received the user input regarding the bundle invitation link. According to some example embodiments, each community may grant an ability (e.g., permission) to join the community to one or more users or user terminals. According to some example embodiments, each user terminal may provide and/or store a list of communities for which a corresponding user is able (e.g., has permission) to join. According to some example embodiments, user information for user terminals able to join each community is stored at the electronic device (e.g., in a table in which respective user information is stored in association with each corresponding community).

In operation S160, the electronic device may receive an input (e.g., a user input) of selecting at least one of the plurality of invitation links included in the detail page. According to some example embodiments of the present disclosure, the second user terminal may receive a user input regarding each of the plurality of invitation links included in the detail page.

According to some example embodiments, in response to receiving a user input of selecting at least one of the plurality of invitation links, the second user terminal may transmit, to the electronic device, a joining request signal regarding the selected invitation link.

According to some example embodiments, after receiving the user input of selecting at least one of the plurality of invitation links, the second user terminal may further receive a user input of requesting to join the selected invitation link. In this case, in response to the user input of requesting to join the selected invitation link, the second user terminal may transmit, to the electronic device, a joining request signal regarding the selected invitation link. A method of transmitting the joining request signal will be described in detail below in operation S170.

In operation S170, the electronic device may receive, from the second user terminal, a data pair including the selected at least one invitation link and an identification value of the second user terminal (e.g., a identifier of the second user terminal, an account identifier of a user of the second user terminal, etc.). According to some example embodiments, upon receiving the joining request signal regarding the selected invitation link, the second user terminal may further transmit, to the electronic device, the selected at least one invitation link and the identification value of the second user terminal. The electronic device may perform a joining procedure of the second user terminal for a community connected to the selected invitation link, based on the received identification value of the second user terminal. According to some example embodiments, the data pair is a single data structure including both the selected at least one invitation link and the identification value of the second user terminal. According to some example embodiments, the electronic device may perform the joining procedure to register the second user terminal with the community connected to the selected invitation link using the identification value of the second user terminal. According to some example embodiments, after the joining procedure is completed, the second user terminal exchanges information (e.g., sends and/or receives messages, such as instant messages or posts displayed on a community page/portal, documents, images, videos, etc.) on a network (e.g., on a platform such as a website, SNS, application, etc.) associated with the community.

According to some example embodiments, the electronic device may receive user information from the second user terminal. According to some example embodiments, the electronic device may obtain the user information in operation S170 after receiving, from the second user terminal, the user input regarding the invitation link to be joined. Accordingly, the electronic device may identify joinability of the selected invitation link, based on the received user information of the second user terminal.

Figure 4:
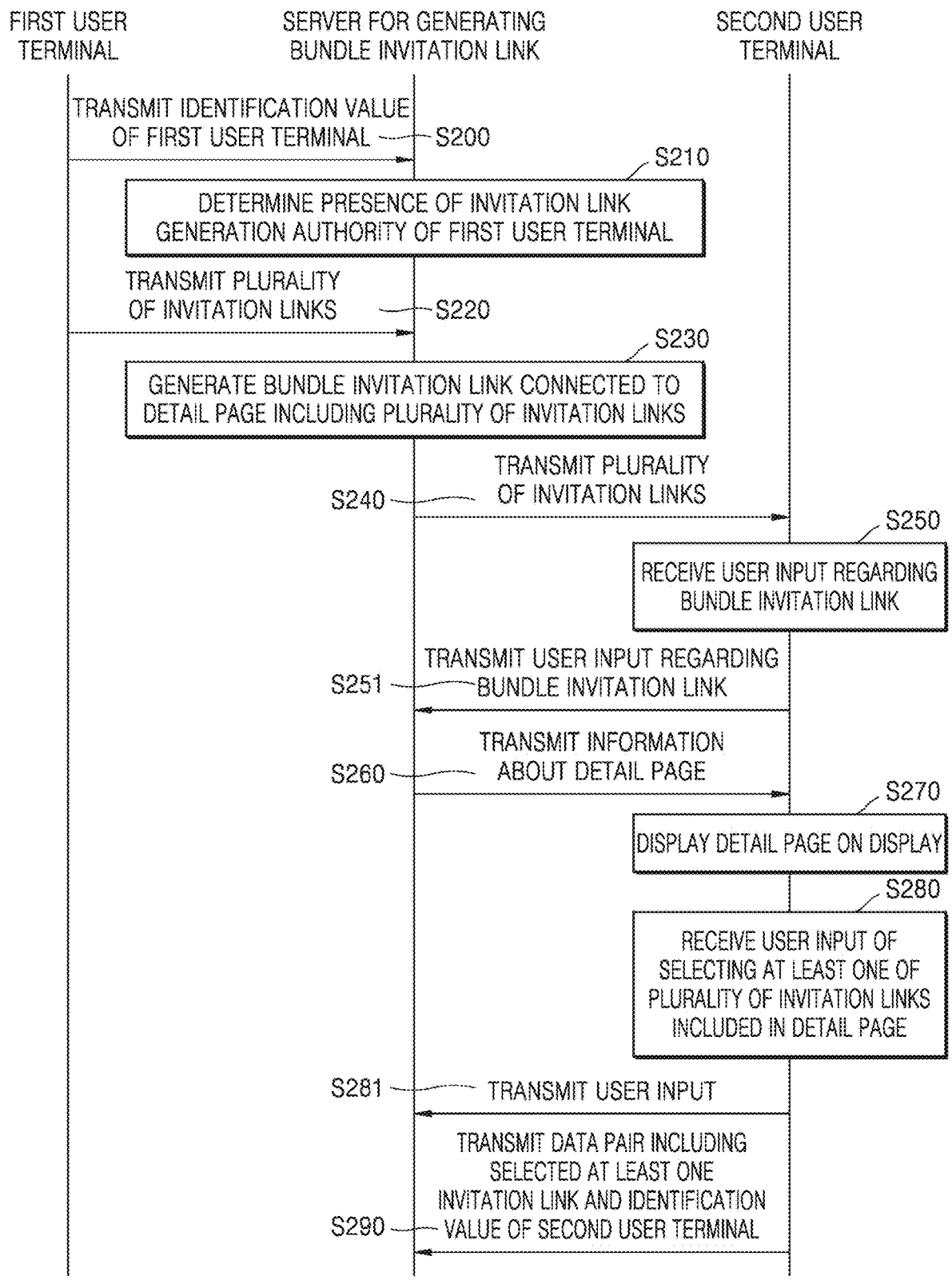
FIG. 4 is a flowchart of a method of generating a bundle invitation link, wherein the method is illustrated according to operating subjects, according to some example embodiments of the present disclosure.

FIG. 4 is a flowchart of a method of generating a bundle invitation link, wherein the method is illustrated according to operating subjects, according to some example embodiments of the present disclosure.

In operation S200, a first user terminal may transmit, to a server for generating a bundle invitation link, an identification value of the first user terminal.

In operation S210, the server may determine presence of invitation link generation authority of the first user terminal. In operation S220, the first user terminal may transmit a plurality of invitation links. According to some example embodiments, the server may determine the presence of the invitation link generation authority of the first user terminal for each of the plurality of invitation links, after receiving the plurality of invitation links in operation S220. According to some example embodiments, the server may determine the presence of the invitation link generation authority by only using the identification value of the first user terminal.

In operation S230, the server may generate a bundle invitation link connected to a detail page including the plurality of invitation links.

In operation S240, the server may transmit the bundle invitation link to a second user terminal. The server may transmit, to the second user terminal, the bundle invitation link according to a link transmission request of the first user terminal, according to some example embodiments, may transmit, to the second user terminal, the bundle invitation link according to a link transmission request of the second user terminal, according to some example embodiments, or may transmit, to the second user terminal, the bundle invitation link according to a link transmission request of a third user terminal or an external server connected via a network.

In operation S250, the second user terminal may receive a user input regarding the bundle invitation link. The second user terminal may receive the bundle invitation link from the server via any one of various routes. For example, the bundle invitation link may be received via a webpage, a messenger, an email, and/or an SNS application. When the bundle invitation link is output to the second user terminal via any one of various applications, the second user terminal may receive a user input of selecting the bundle invitation link.

In operation S251, the second user terminal may transmit, to the server, a user input regarding the bundle invitation link. Accordingly, the server may transmit, to the second user terminal, content connected to the bundle invitation link.

In operation S260, the server may transmit, to the second user terminal, information about a detail page connected to the bundle invitation link. For example, when the detail page is output via a web browser, the server may transmit, to the second user terminal, a webpage address corresponding to the detail page. Alternatively, when the detail page is output via a separate application, the server may transmit, to the second user terminal, an instruction invoking the separate application.

Then, in operation S270, the second user terminal may display the detail page on a display thereof. According to some example embodiments, a graphics user interface (GUI) of the detail page may include a plurality of joining UI objects corresponding to the plurality of invitation links, respectively. According to some example embodiments, the GUI of the detail page may include a plurality of selection UI objects for selecting the plurality of invitation links, respectively, and a joining UI object for connection to selected at least one invitation link. Detailed descriptions thereof will be described with reference to FIGS. 11 and 12 below.

In operation S280, the second user terminal may receive a user input of selecting at least one of the plurality of invitation links included in the detail page, and in operation S281, the second user terminal may transmit, to the server, the user input of selecting at least one of the plurality of invitation links.

In operation S290, the second user terminal may transmit, to the server, a data pair including the selected at least one invitation link and an identification value of the second user terminal. When a data pair including a selected invitation link and an identification value of a user terminal is generated, the server may easily perform a joining procedure for a community corresponding to the selected invitation link later. Here, the server may perform the joining procedure or an external server connected via a network may perform the joining procedure. According to some example embodiments, operations S281 and S290 may be combined into a single operation (e.g., the user input may be reflected in the data pair sent to the server).

Figure 5:
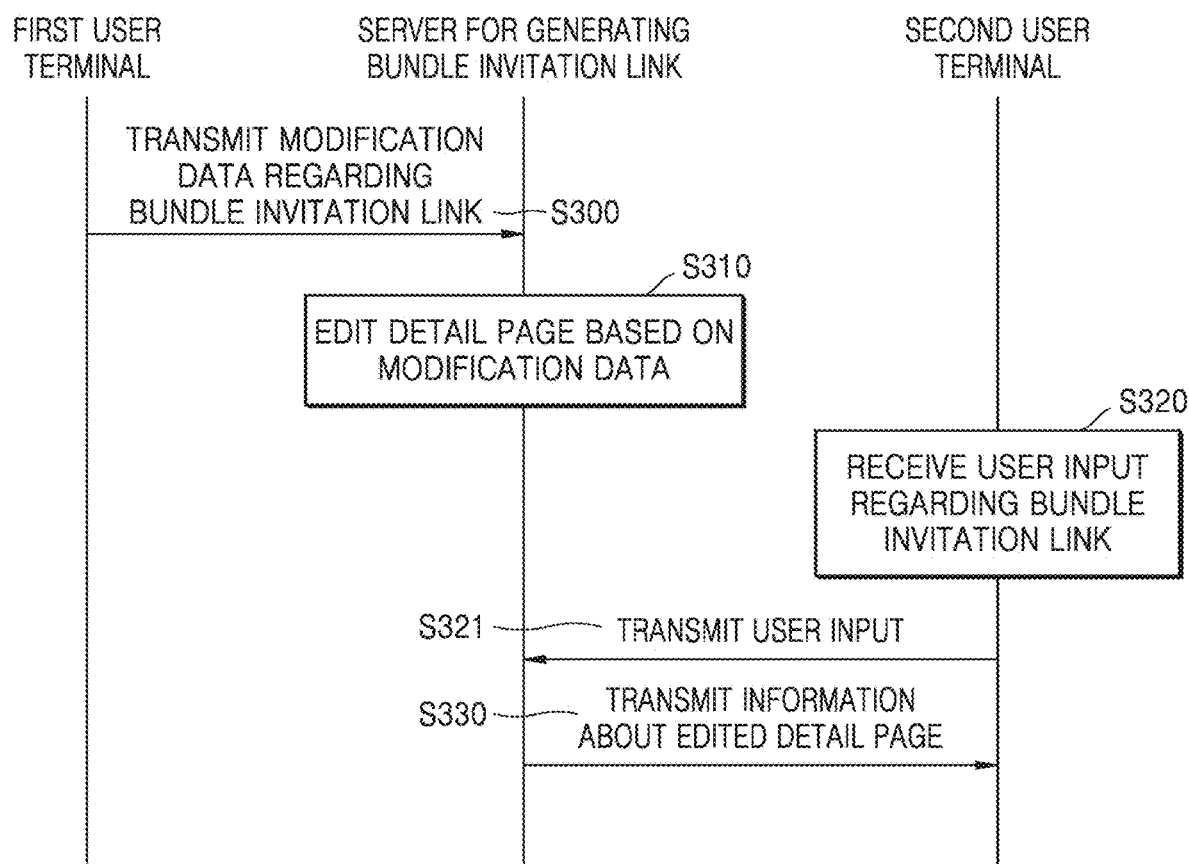
FIGS. 5 and 6 are flowcharts for describing a case where a bundle invitation link is edited, according to some example embodiments of the present disclosure.
Figure 6:
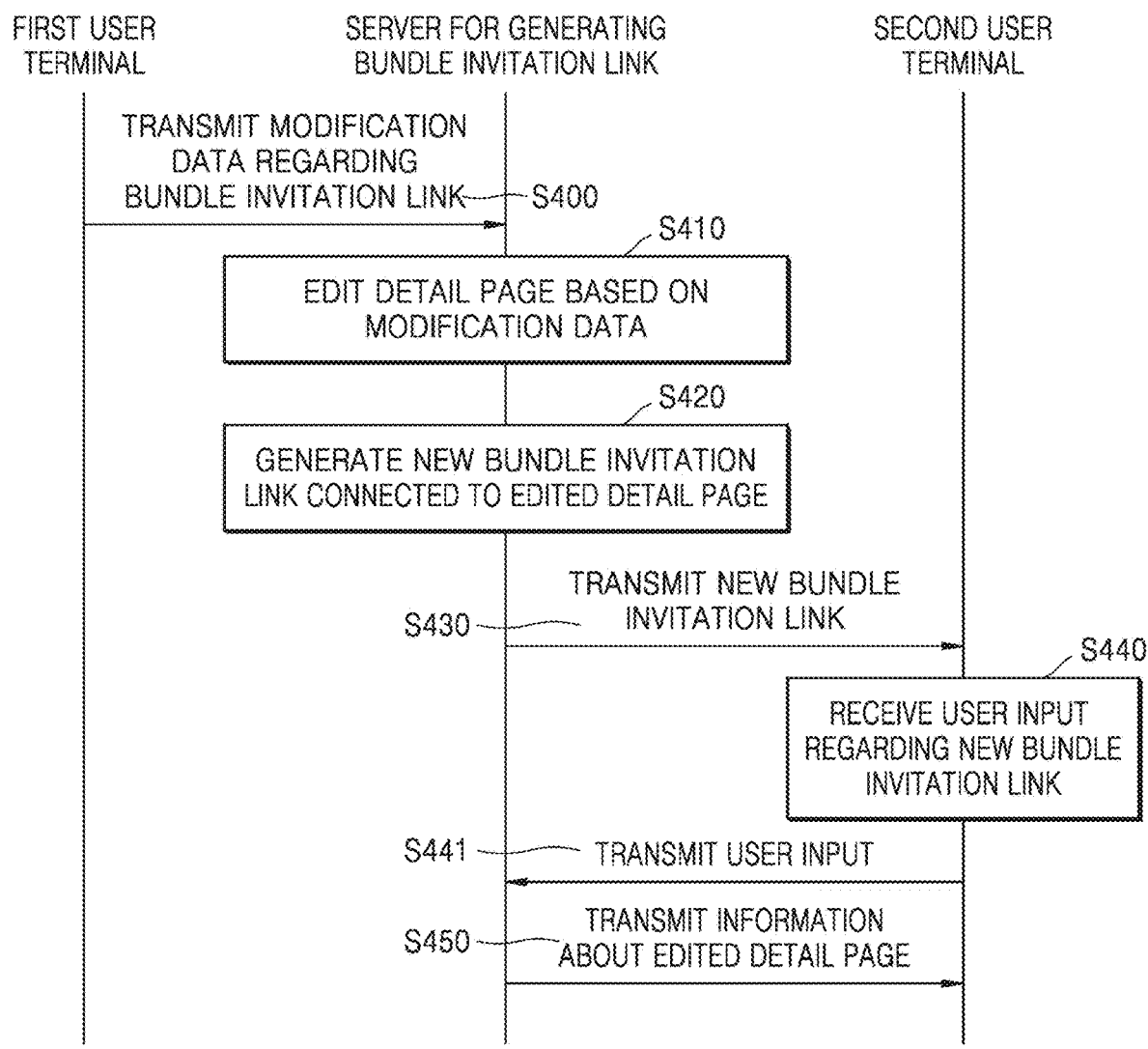

FIGS. 5 and 6 are flowcharts for describing a case where a bundle invitation link is edited, according to some example embodiments of the present disclosure.

Hereinafter, a case where content of a pre-generated detail page (or generated detail page) is modified when modification data regarding a bundle invitation link is received, according to some example embodiments of the present disclosure, will be described with reference to FIG. 5.

In operation S300, a first user terminal may transmit, to a server for generating a bundle invitation link, the modification data regarding the bundle invitation link. The first user terminal may modify various settings related to the bundle invitation link or a configuration of invitation links included in the bundle invitation link. For example, the first user terminal may delete at least one invitation link included in the bundle invitation link or may add a new invitation link to the bundle invitation link. Also, the first user terminal may modify various types of information, such as a name, description, format, valid period, expiration date, and/or extension date of the bundle invitation link.

In operation S310, the server may edit the detail page based on the modification data. According to some example embodiments, the server may modify the content of the pre-generated detail page (or generated detail page) based on the received modification data.

Then, a second user terminal may select the received bundle invitation link. When the second user terminal receives a user input regarding the bundle invitation link in operation S320, the second user terminal may transmit the user input to the server in operation S321.

In this case, the server may transmit, to the second user terminal, information about the edited detail page in operation S330.

As described above, when the content of the pre-generated detail page (or generated detail page) connected to the bundle invitation link is modified, the server may reflect the modified content without sharing a new bundle invitation link, and thereby improving convenience and reducing resource consumption (e.g., delay, bandwidth, power, etc.).

According to some example embodiments, when the same user terminal selects, or similar user terminals select, a bundle invitation link a plurality of times, content of an output detail page may vary depending on whether a time point when the bundle invitation link is selected is before or after modification data is reflected.

Hereinafter, a case where a new bundle invitation link connected to an edited detail page is generated when modification data regarding a bundle invitation link is received, according to some example embodiments of the present disclosure, will be described with reference to FIG. 6.

In operation S400, a first user terminal may transmit, to a server for generating a bundle invitation link, the modification data regarding the bundle invitation link. As described above, the first user terminal may modify various settings related to the bundle invitation link or a configuration of invitation links included in the bundle invitation link. For example, the first user terminal may delete at least one invitation link included in the bundle invitation link or may add a new invitation link to the bundle invitation link. Also, the first user terminal may modify various types of information, such as a name, description, format, valid period, expiration date, and/or extension date of the bundle invitation link.

In operation S410, the server may edit a detail page based on the modification data. According to some example embodiments, the server may generate the edited detail page separate from the existing detail page. In this case, the server may store both content of the existing detail page and content of the edited detail page.

Accordingly, in operation S420, the server may generate a new bundle invitation link connected to the edited detail page. According to some example embodiments, the existing bundle invitation link may be connected to the existing detail page before being edited.

Then, in operation S430, the server may transmit the new bundle invitation link to the second user terminal, and in operation S440, the second user terminal may receive a user input regarding the new bundle invitation link.

In operation S441, the second user terminal may transmit the user input regarding the new bundle invitation link to the server, and in operation S450, the server may transmit information about the edited detail page to the second user terminal.

As described above, when the pre-generated bundle invitation link (or generated bundle invitation link) and the new bundle invitation link are both maintained, the bundle invitation link that has been generated may always output detail page of the same or similar content. Also, according to some example embodiments, it may be convenient to manage versions of a plurality of bundle invitation links according to content modification.

Hereinafter, GUI configurations output on displays of user terminals, according to some example embodiments of the present disclosure, will be described with reference to FIGS. 7 through 13A and 13B. However, the GUI configurations shown in FIGS. 7 through 13A and 13B are only examples, and configurations and forms of GUIs displayed on the user terminals, according to some example embodiments of the present disclosure, are not limited thereto.

Figure 7:
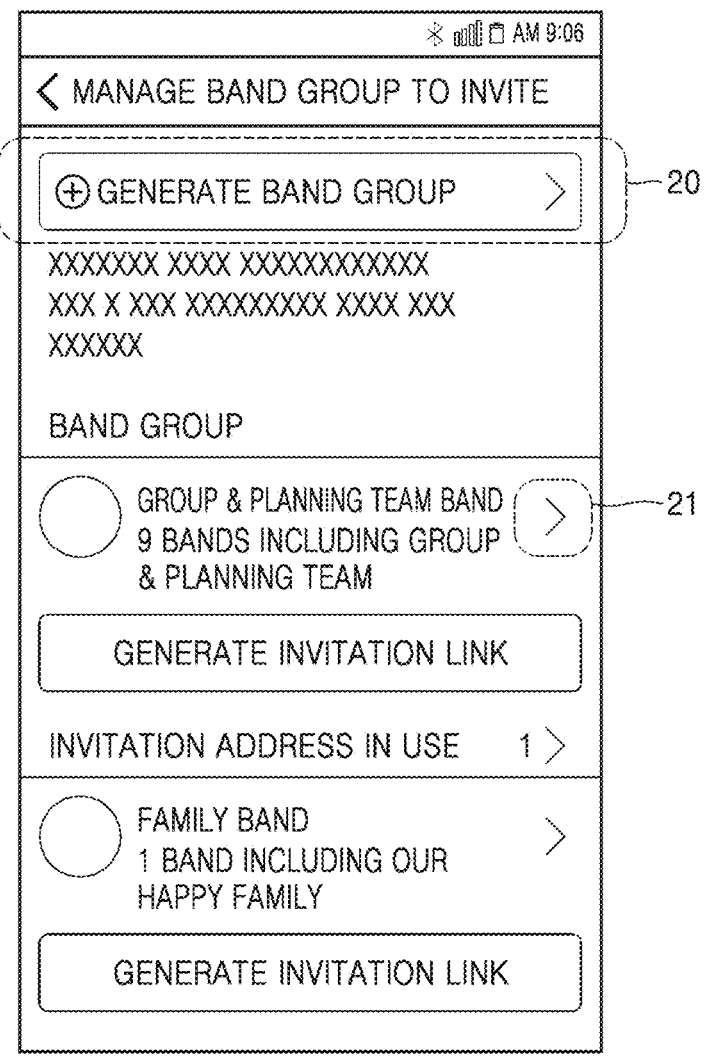
FIG. 7 illustrates an example of a graphics user interface (GUI) configuration of a screen for managing a bundle invitation link, according to some example embodiments of the present disclosure.

FIG. 7 illustrates an example of a GUI configuration of a screen for managing a bundle invitation link, according to some example embodiments of the present disclosure. According to some example embodiments, the screen illustrated in FIG. 7 is a screen of the first user terminal 100.

According to some example embodiments of the present disclosure, a UI object 21 for identifying a pre-generated bundle invitation link (or generated bundle invitation link) and a UI object 20 for generating a new bundle invitation link may be displayed on a GUI region of a screen for managing a bundle invitation link output on the first user terminal 100.

According to some example embodiments, when a user input regarding the UI object 21 is received, a screen for editing the pre-generated bundle invitation link (or generated bundle invitation link) may be output on the display of the first user terminal 100. A method of editing a bundle invitation link will be described in detail below with reference to FIG. 9.

According to some example embodiments, when a user input regarding the UI object 20 is received, a screen for generating the new bundle invitation link may be output on the display of the first user terminal 100. Hereinafter, a method of generating a new bundle invitation link will be described in detail with reference to FIGS. 8A and 8B.

Figure 8A:
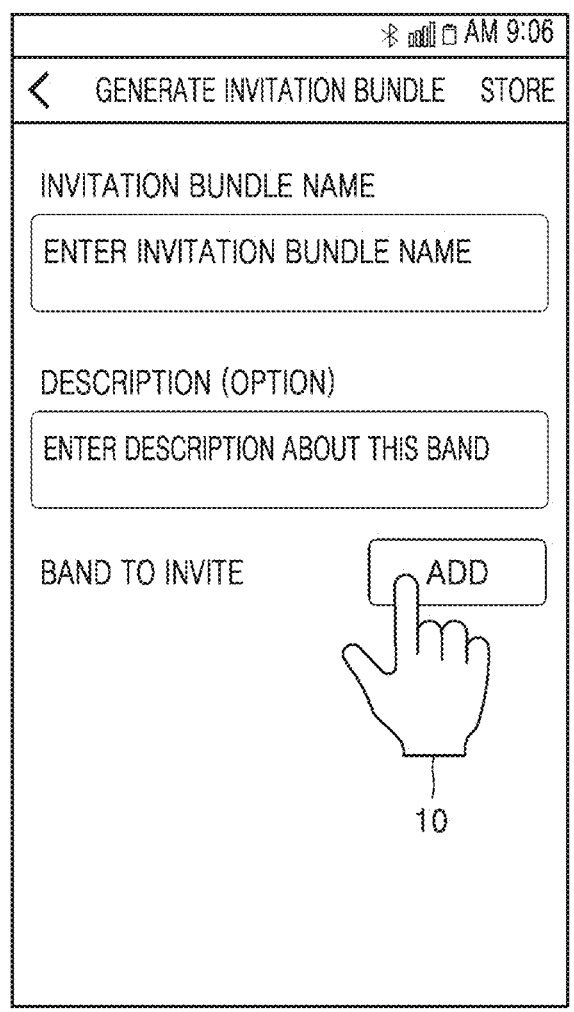
FIGS. 8A and 8B illustrate examples of a GUI configuration of a screen for generating a bundle invitation link, according to some example embodiments of the present disclosure.
Figure 8B:
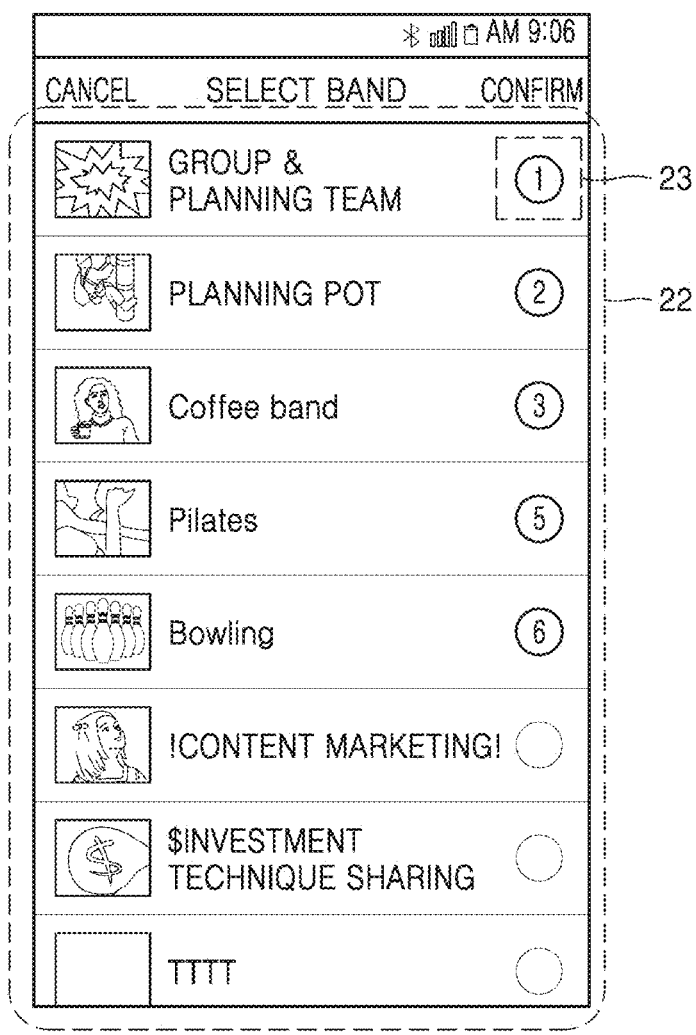

FIGS. 8A and 8B illustrate examples of a GUI configuration of a screen for generating a bundle invitation link, according to some example embodiments of the present disclosure.

Referring to FIG. 8A, the first user terminal 100 may designate a configuration of "Invitation bundle name", "Description" about an invitation bundle, and/or a plurality of invitation links to be included in a bundle invitation link, so as to generate the bundle invitation link. According to some example embodiments, the first user terminal 100 may receive a user input 10 of designating the plurality of invitation links to be included in the bundle invitation link.

In this case, a screen for selecting at least one invitation link to be included in the bundle invitation link may be output on the display of the first user terminal 100.

Referring to FIG. 8B, a list 22 of a plurality of invitation links selectable by a user may be output on the display of the first user terminal 100. According to some example embodiments, the list 22 may display only an invitation link(s) that the first user terminal 100 has authority to generate. According to some example embodiments, the list 22 may include all of a plurality of invitation links respectively corresponding to a plurality of communities joined by the first user terminal 100. In this case, the list 22 may separately display some invitation links that the first user terminal 100 have authority to generate. According to some example embodiments, the first user terminal 100 may confirm each invitation link to be included in the bundle invitation link by selecting a respective confirmation user interface object 23.

Figure 9:
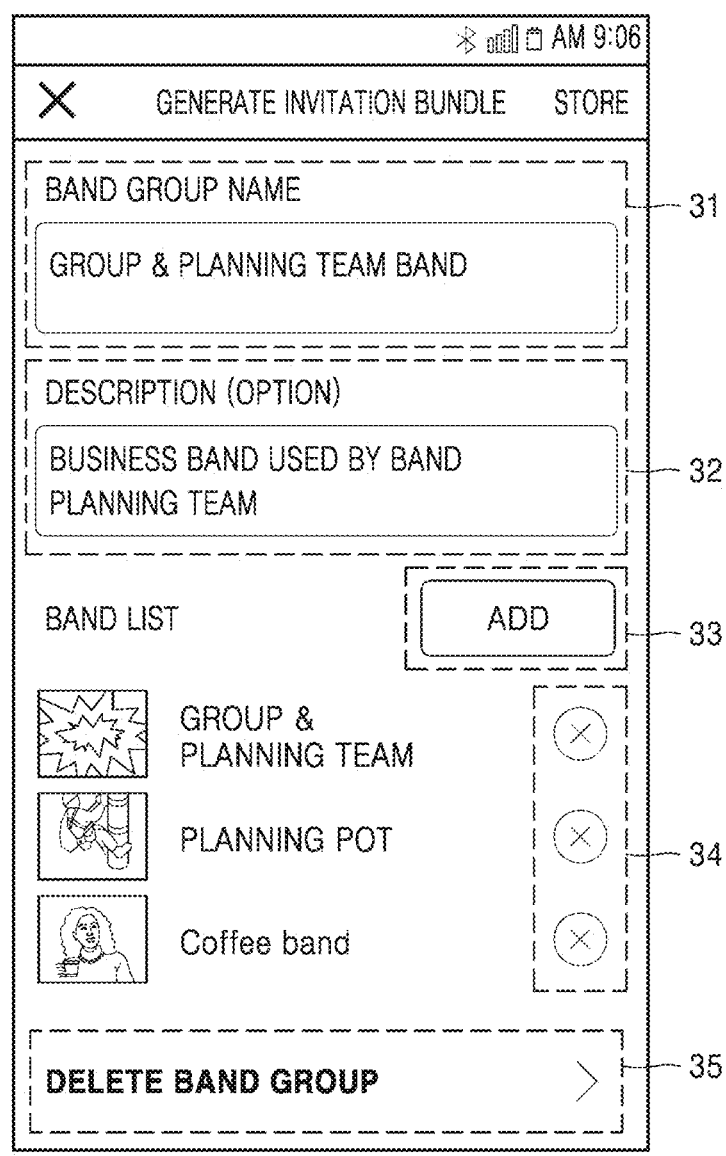
FIG. 9 illustrates an example of a GUI configuration of a screen for editing a bundle invitation link, according to some example embodiments of the present disclosure.

FIG. 9 illustrates an example of a GUI configuration of a screen for editing a bundle invitation link, according to some example embodiments of the present disclosure.

According to some example embodiments, the first user terminal 100 may generate modification data for the bundle invitation link. The first user terminal 100 may modify various settings related to the bundle invitation link or a configuration of invitation links included in the bundle invitation link. For example, the first user terminal 100 may delete at least one invitation link included in the bundle invitation link or may add a new invitation link to the bundle invitation link. Also, the first user terminal 100 may modify various types of information, such as a name, description, format, valid period, expiration date, and/or extension date of the bundle invitation link.

For example, referring to FIG. 9, the first user terminal 100 may modify "Name" 31 and/or "Description" 32 related to information of the bundle invitation link, further add a new invitation link to the bundle invitation link by selecting a UI object 33, delete at least one invitation link from the bundle invitation link by selecting a UI object 34, and/or delete the bundle invitation link itself by selecting a UI object 35.

Figure 10:
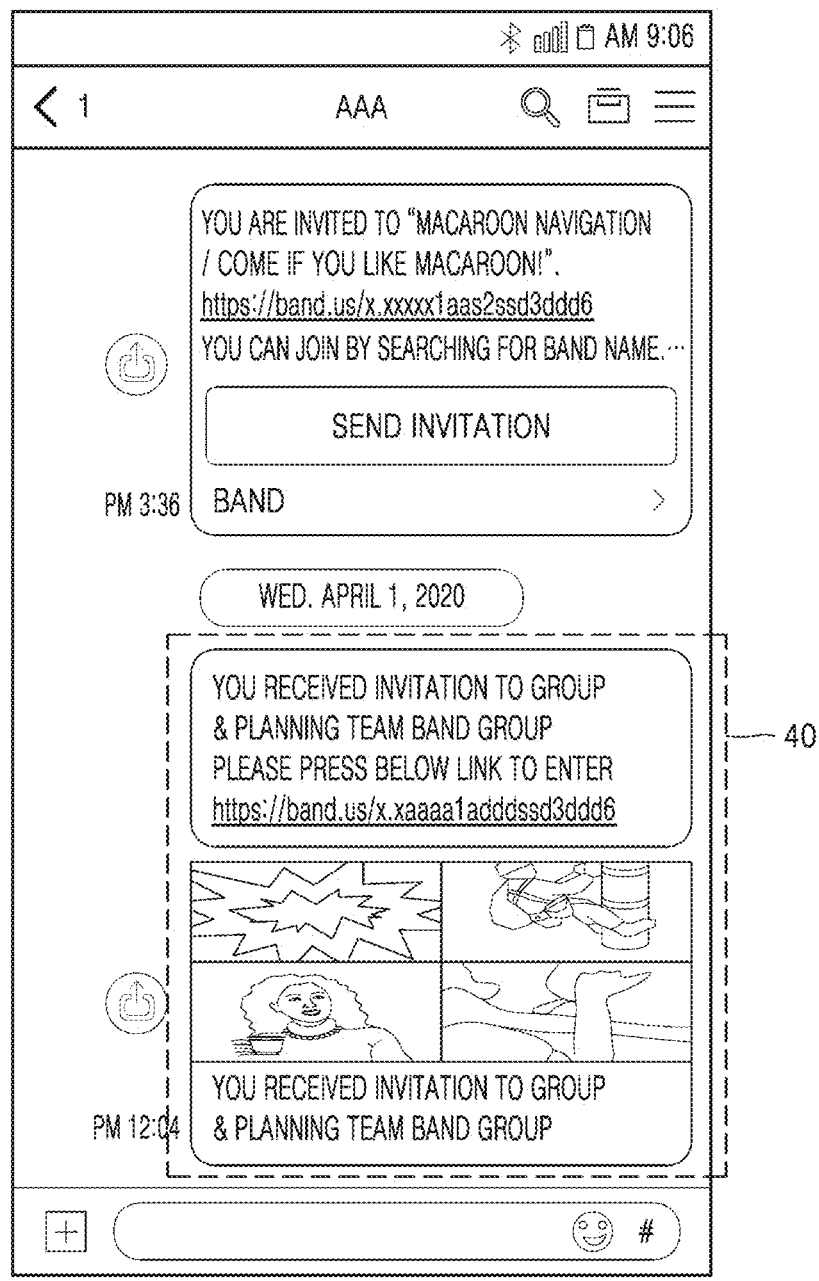
FIG. 10 illustrates an example of a GUI configuration of a screen for sharing a bundle invitation link, according to some example embodiments of the present disclosure.

FIG. 10 illustrates an example of a GUI configuration of a screen for sharing a bundle invitation link, according to some example embodiments of the present disclosure. According to some example embodiments, the screen illustrated in FIG. 10 is a screen of the second user terminal 110.

According to some example embodiments of the present disclosure, formats of a plurality of invitation links and bundle invitation link are not limited. For example, the plurality of invitation links and bundle invitation link may be generated in forms of images, moving images, and/or text, and/or may be shared via separate applications, such as an email, a messenger, and/or various SNSs.

For example, when the bundle invitation link generated in the form of text is transmitted to the second user terminal 110 via an SNS, a user may select a bundle invitation link 40 shared on the SNS. Hereinafter, a detail page output when the second user terminal 110 receives a user input regarding the bundle invitation link 40 will be described with reference to FIGS. 11 through 13A and 13B.

Figure 11:
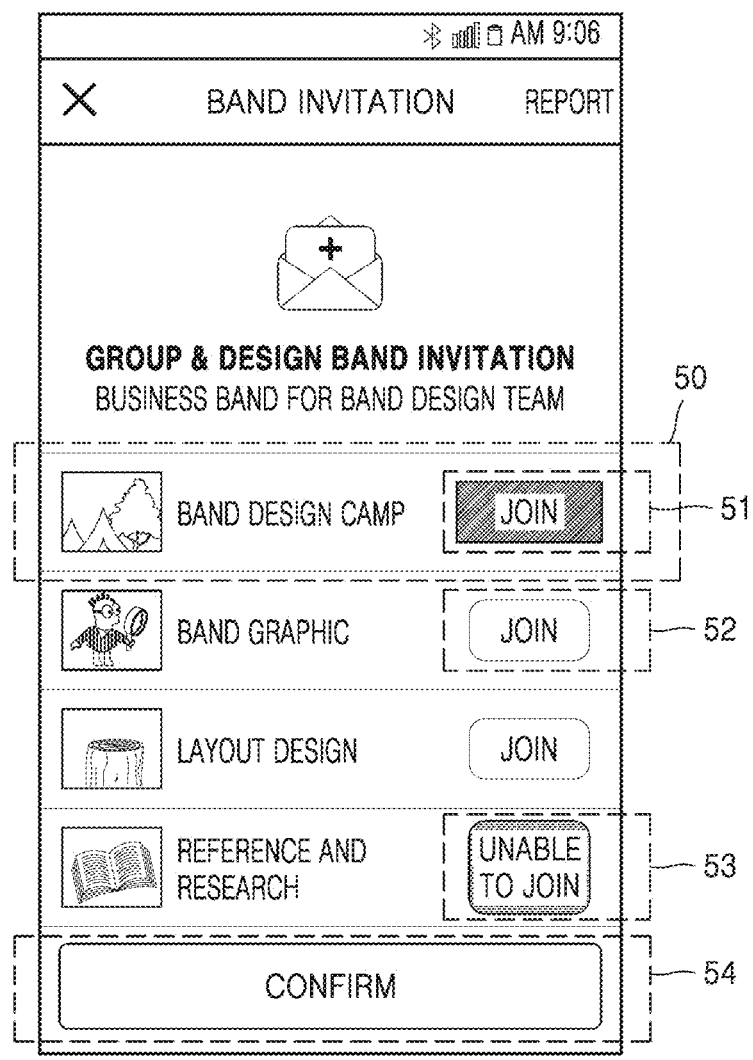
FIGS. 11 and 12 illustrate examples of a GUI configuration of a detail page screen output when a bundle invitation link is selected, according to some example embodiments of the present disclosure.
Figure 12:
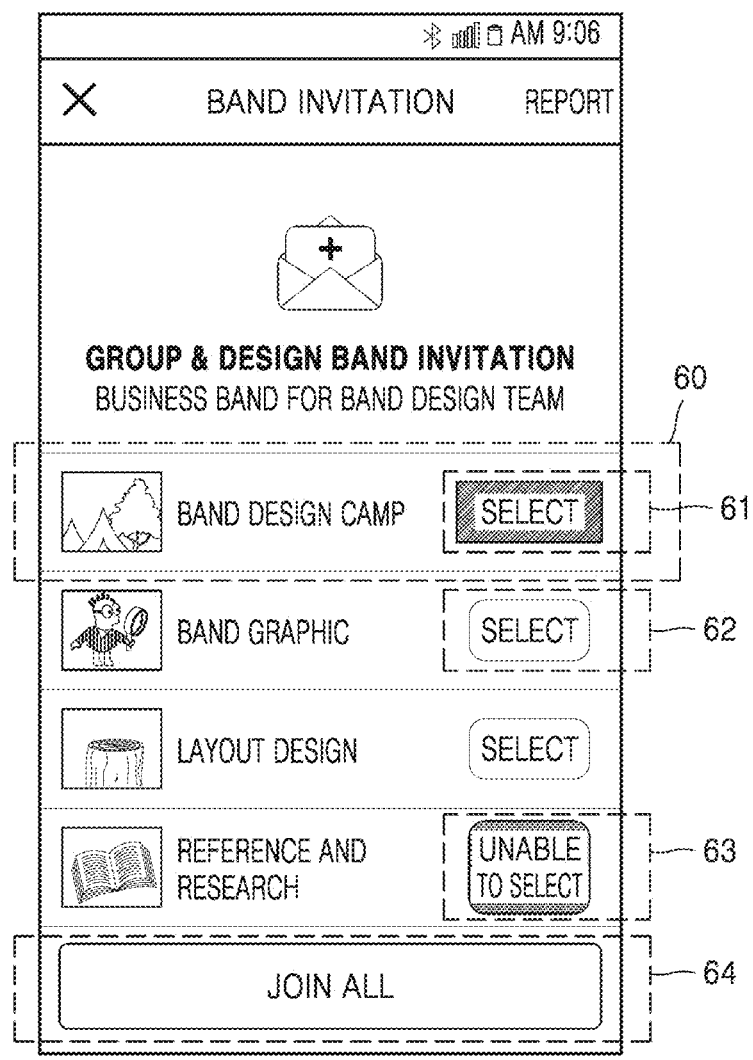

FIGS. 11 and 12 illustrate examples of a GUI configuration of a detail page screen output when a bundle invitation link is selected, according to some example embodiments of the present disclosure. According to some example embodiments, the screen illustrated in FIGS. 11 and 12 is a screen of the second user terminal 110.

According to some example embodiments, a detail page connected to a bundle invitation link may be output on the second user terminal 110 that received a user input regarding the bundle invitation link.

For example, the detail page may be generated in a format of a webpage, and may be overlaid on an application pre-output, or output, on the display of the second user terminal 110. Some example embodiments are not limited thereto, and a separate application may be invoked and the detail page may be output on the separate application. In this case, the second user terminal 110 may output the detail page on an uppermost layer of the display or may output the detail page in a GUI region of the separate application. When the detail page is output via a web browser, the second user terminal 110 may receive a webpage address corresponding to the detail page. Alternatively, when the detail page is output via the separate application, the second user terminal 110 may receive an instruction invoking the separate application.

Referring to FIG. 11, a GUI of a detail page according to some example embodiments may include a plurality of joining UI objects 51 through 53 respectively corresponding to a plurality of invitation links.

The second user terminal 110 may receive a user input regarding each of the plurality of invitation links included in the detail page. According to some example embodiments, in response to receiving a user input of selecting at least one of the plurality of invitation links, the second user terminal 110 may transmit, to a server for generating a bundle invitation link, a joining request signal regarding a selected invitation link 50.

The server may obtain user information of the second user terminal 110, and modify a configuration of the detail page connected to the bundle invitation link, based on the obtained user information. For example, the server may modify the joining UI object 53 of an invitation link connected to a community that is unable to be joined by the second user terminal 110 such that the joining UI object 53 is unable to be selected. In other words, according to some example embodiments, the server may disable the joining UI object 53 of the invitation link that is unable to be joined by the second user terminal 110, based on the user information obtained from the second user terminal 110. In this case, even when the second user terminal 110 receives a user input regarding the bundle invitation link, the detail page including a disabled invitation link may be output on the display.

In the detail page of FIG. 11, the bundle invitation link includes the plurality of invitation links connected to a community "Band design camp", a community "Band graphic", a community "Layout design", and a community "Reference and research", and the second user terminal 110 is unable to join the community "Reference and research". Also, in FIG. 11, a user has selected the joining UI object 51 of the invitation link 50 for the community "Band design camp", and did not select the joining UI object 52 for the community "Band graphic" or a joining UI object for the community "Layout design". In this case, in response to receiving a user input of selecting the joining UI object 51 for the community "Band design camp", the second user terminal 110 may transmit, to the server, a data pair including an identification value of the second user terminal 110 and information about the community "Band design camp". In some example embodiments, the second user terminal 110 may end the detail page when a user input regarding a confirmation UI object 54 is received.

Referring to FIG. 12, a GUI of a detail page according to some example embodiments may include a plurality of selection UI objects 61 through 63 for respectively selecting a plurality of invitation links, and a joining UI object 64 for connection to selected at least one invitation link 60.

According to some example embodiments, after receiving a user input of selecting at least one of the plurality of invitation links, the second user terminal 110 may further receive a user input of requesting to join the selected at least one invitation link 60 with respect to the joining UI object 64. In this case, in response to the user input of requesting to join the selected at least one invitation link 60, the second user terminal 110 may transmit, to a server for generating a bundle invitation link, a joining request signal regarding the selected at least one invitation link 60.

In the detail page of FIG. 12, a bundle invitation link includes the plurality of invitation links connected to a community "Band design camp", a community "Band graphic", a community "Layout design", and a community "Reference and research", and the second user terminal 110 is unable to select the community "Reference and research".

Also, in FIG. 12, a user has selected the selection UI object 61 of the invitation link 60 for the community "Band design camp", and did not select the selection UI object 62 for the community "Band graphic" or a selection UI object for the community "Layout design".

In some example embodiments, unlike FIG. 11, in response to a user input regarding the joining UI object 64, such as "Join all", for joining the selected at least one invitation link 60, the second user terminal 110 may transmit, to the server, a data pair including an identification value of the second user terminal 110 and information about the community "Band design camp". In addition, the second user terminal 110 may end the detail page (e.g., terminate display of the detail page) after receiving the user input regarding the joining UI object 64 and transmitting the data pair.

Figure 13A:
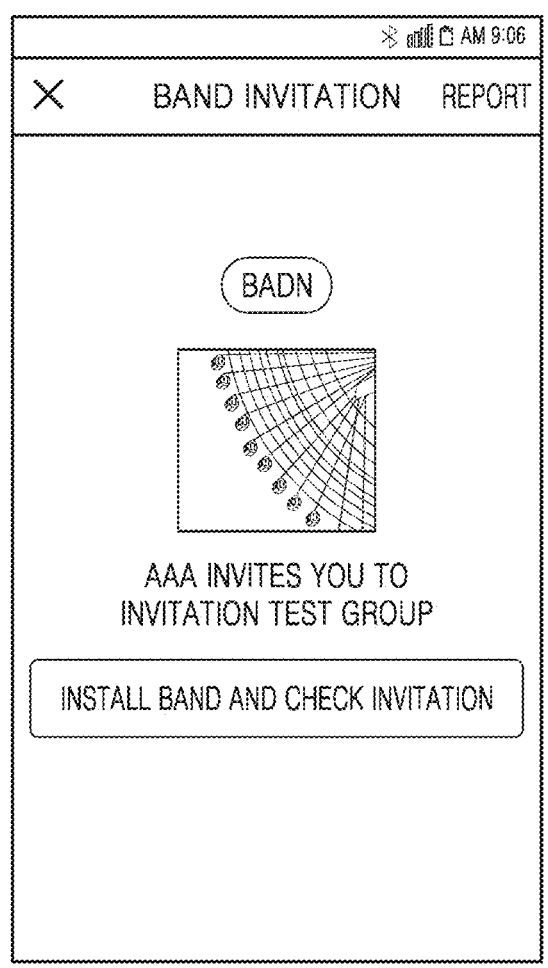
FIGS. 13A and 13B illustrate examples of a GUI configuration of a screen output when each invitation link included in a bundle invitation link is selected, according to some example embodiments of the present disclosure.
Figure 13B:

FIGS. 13A and 13B illustrate examples of a GUI configuration of a screen output when each invitation link included in a bundle invitation link is selected, according to some example embodiments of the present disclosure.

A detail page connected to the bundle invitation link may include a plurality of joining UI objects connected to individual invitation links that are respectively connected to communities. Referring to FIG. 13A, when the second user terminal 110 receives a user input of selecting the joining UI object regarding the individual invitation link, according to some example embodiments, a detail page of the selected invitation link may be output on the second user terminal 110.

Referring to FIG. 13B, according to some example embodiments, the bundle invitation link may be deleted. In this case, bundle invitation link sharing content in a separate application is unable to be deleted. Accordingly, a server for generating a bundle invitation link, according to some example embodiments of the present disclosure, may transmit a detail page notifying that the bundle invitation link has been deleted, to the second user terminal 110 that received a user input regarding the deleted bundle invitation link.

According to some example embodiments, operations described herein as being performed by the first user terminal 100, the server 120, the second user terminal 110, the processor 102, the processor 122, the processor 112, the communication module 104, the communication module 124, the communication module 114, the input/output interface 103, the input/output interface 123 and/or the input/output interface 113 may be performed by processing circuitry.

Conventional devices for inviting user terminals to join communities provide a separate invitation link for each community. Accordingly, excessive resources (e.g., processor, memory, bandwidth, power, delay, etc.) are consumed in separately generating the different invitation links and sending the different invitation links to each user terminal. Also, a joining procedure is separately performed for each of the separate invitation links resulting in excessive resource consumption (e.g., processor, memory, bandwidth, power, delay, etc.) and user inconvenience.

However, according to some example embodiments, improved devices and methods are provided for inviting user terminals to join communities. For example, according to some example embodiments, a server generates a bundle invitation link corresponding to a detail page and provides the single bundle invitation link to each user terminal. The user terminals are able to access the detail page including a plurality of invitation links using the bundle invitation link. Also, the user terminals are able to select more than one invitation link, and initiate a joining procedure for all communities associated with the selected invitation links, using the detail page. Accordingly, the improved devices and methods overcome the deficiencies of the conventional devices to reduce resource consumption (e.g., processor, memory, bandwidth, power, delay, etc.) and improve user convenience.

The apparatus described above may be realized by a hardware component, a software component, and/or a combination of a hardware component and a software component. For example, the apparatus and component described in some example embodiments may be realized by using one or more general-purpose computers or special purpose computers, such as a processor, a controller, an arithmetic logic unit (ALU), a digital signal processor, a micro-computer, a field programmable gate array (FPGA), a programmable logic unit (PLU), a micro-processor, or any other device capable of executing and responding to an instruction. A processing device may execute an operating system (OS) and one or more software applications executed on the OS. Also, the processing device may access, store, manipulate, process, and generate data in response to execution of software. For convenience of description, it has been described that one processing device is used, but it would be obvious to one of ordinary skill in the art that the processing device may include a plurality of processing elements and/or a plurality of types of processing elements. For example, the processing device may include a plurality of processors or one processor and one controller. Also, another processing configuration, such as a parallel processor, is possible.

The software may include a computer program, a code, an instruction, or a combination thereof, and may configure the processing device to operate as desired or instruct the processing device independently or collectively. The software and/or data may be embodied, permanently or temporarily, by any type of machine, component, physical device, virtual equipment, computer storage medium or device, or transmitted signal wave, such as to be analyzed by the processing device or provided to the processing device. The software may be distributed on a computer system connected to a network, and stored or executed in a distributed manner. The software and data may be stored in one or more computer-readable recording media.

Methods according to some example embodiments may be recorded on a computer-readable recording medium by being implemented in a form of program commands executed by using various computers. The computer-readable recording medium may include at least one of a program command, a data file, and a data structure, independently or collectively. The program commands recorded in the computer-readable recording medium may be specially designed for some example embodiments or well known to one of ordinary skill in the computer software field. Examples of the computer-readable recording medium include magnetic media such as hard disks, floppy disks, and magnetic tapes, optical media such as CD-ROMs and DVDs, magneto-optical media such as floptical disks, and hardware devices specially configured to store and perform program commands, such as read-only memory (ROM), random-access memory (RAM), and flash memory. Examples of the computer command include mechanical codes prepared by a compiler, and high-level language codes executable by a computer by using an interpreter. The hardware device may be configured to operate as one or more software modules to perform operations of some example embodiments, or vice versa.

As described above, some example embodiments have been described by the limited examples and drawings, but various modifications and modifications are possible from the above description by one of ordinary skill in the art. For example, appropriate results may be achieved even when the described techniques are performed in an order different from the described method, and/or components, such as a system, a structure, a device, and a circuit, are combined or associated in a form different from the described method, or replaced by other components or equivalents.

Therefore, other implementations, other examples, and equivalents of claims are also within the scope of the claims described below.

The foregoing description has been provided for purposes of illustration and description. It is not intended to be exhaustive or to limit the disclosure. Individual elements or features of some example embodiments are generally not limited, but, where applicable, are interchangeable and may be used in a selected example, even if not specifically shown or described. The same may also be modified in various ways. Such modifications are not to be regarded as a departure from the disclosure, and all such modifications are intended to be included within the scope of the disclosure.

What is claimed is:

1. A method, performed by a computing device, for generating a bundle invitation link, the method comprising:
    determining a set of invitation links corresponding to a plurality of communities joined by a first user terminal;
    determining whether the first user terminal has an invitation link generation authority for each invitation link among the set of invitation links based on an identification value of the first user terminal;
    obtaining a subset of invitation links for which the first user terminal has the invitation link generation authority from among the set of invitation links;
    transmitting, to the first user terminal, the subset of invitation links;
    obtaining a plurality of invitation links from the first user terminal based on a selection of the plurality of invitation links from among a list of the subset of invitation links, each of the plurality of invitation links being connected to at least one community joined by the first user terminal;
    generating a bundle invitation link connected to a detail page, the detail page including the plurality of invitation links;
    transmitting the bundle invitation link to a second user terminal;
    causing a display of the second user terminal to display the detail page in response to receiving, from the second user terminal, an input corresponding to the bundle invitation link; and
    receiving a data pair from the second user terminal, the data pair including at least one invitation link and an identification value of the second user terminal, and the at least one invitation link being selected from among the plurality of invitation links included in the detail page.

2. The method of claim 1, further comprising:
    receiving, from the first user terminal, the identification value of the first user terminal.

3. The method of claim 1, wherein
    the detail page includes a plurality of joining user interface (UI) objects corresponding to the plurality of invitation links; and
    the receiving the data pair comprises receiving the data pair based on a selection of at least one of the plurality of joining UI objects, the at least one invitation link corresponding to the selected at least one joining UI object.

4. The method of claim 1, wherein
    the detail page includes a plurality of selection UI objects and a joining UI object, the plurality of selection UI objects corresponding to the plurality of invitation links; and
    the receiving the data pair comprises receiving the data pair based on a selection of the joining UI object and at least one of the plurality of selection UI objects.

5. The method of claim 4, wherein the receiving the data pair comprises:
    determining whether the second user terminal is able to join the at least one invitation link based on user information obtained from the second user terminal; and
    receiving the data pair based on determining that the second user terminal is able to join the at least one invitation link and a selection of the joining UI object.

6. The method of claim 1, wherein
    the causing the display of the second user terminal to display the detail page comprises disabling an invitation link among the plurality of invitation links that the second user terminal is unable to join based on user information obtained from the second user terminal; and
    the detail page includes the disabled invitation link.

7. The method of claim 1, further comprising:
    receiving modification data from the first user terminal, the modification data corresponding to the bundle invitation link;
    editing the detail page based on the modification data; and
    causing the display of the second user terminal to display the edited detail page in response to re-receiving, from the second user terminal, the input corresponding to the bundle invitation link.

8. The method of claim 1, further comprising:
    receiving modification data from the first user terminal, the modification data corresponding to the bundle invitation link;
    editing the detail page based on the modification data;
    generating a new bundle invitation link connected to the edited detail page;
    transmitting the new bundle invitation link to the second user terminal; and
    causing the display of the second user terminal to display the edited detail page in response to receiving, from the second user terminal, an input corresponding to the new bundle invitation link.

9. A non-transitory computer-readable medium storing a computer program that, when executed by a computer, causes the computer to execute the method of claim 1.

10. The method of claim 1, further comprising:
    registering the second user terminal with one or more communities among the at least one community connected to the at least one invitation link.

11. The method of claim 1, wherein each of the plurality of invitation links is configured to:
    cause registration information to be provided to a corresponding community among the at least one community in response to being selected; or
    provide access to a registration website of the corresponding community in response to being selected.

12. An apparatus for generating a bundle invitation link, the apparatus comprising at least one processor configured to cause the apparatus to:

determine a set of invitation links corresponding to a plurality of communities joined by a first user terminal;

determine whether the first user terminal has an invitation link generation authority for each invitation link among the set of invitation links based on an identification value of the first user terminal;

obtain a subset of invitation links for which the first user terminal has the invitation link generation authority from among the set of invitation links;

transmit, to the first user terminal, the subset of invitation links;

obtain a plurality of invitation links from the first user terminal based on a selection of the plurality of invitation links from among a list of the subset of invitation links, each of the plurality of invitation links being connected to at least one community joined by the first user terminal;

generate a bundle invitation link connected to a detail page, the detail page including the plurality of invitation links;

transmit the bundle invitation link to a second user terminal;

cause a display of the second user terminal to display the detail page in response to receiving, from the second user terminal, an input corresponding to the bundle invitation link; and receive a data pair from the second user terminal, the data pair including at least one invitation link and an identification value of the second user terminal, and the at least one invitation link being selected from among the plurality of invitation links included in the detail page.

13. The apparatus of claim 12, wherein the at least one processor is configured to cause the apparatus to:
receive the identification value of the first user terminal from the first user terminal.

14. The apparatus of claim 12, wherein
the detail page includes a plurality of joining user interface (UI) objects corresponding to the plurality of invitation links; and
the at least one processor is configured to cause the apparatus to receive the data pair based on a selection of at least one of the plurality of joining UI objects, the at least one invitation link corresponding to the selected at least one joining UI object.

15. The apparatus of claim 12, wherein
the detail page includes a plurality of selection UI objects and a joining UI object, the plurality of selection UI objects corresponding to the plurality of invitation links; and
the at least one processor is configured to cause the apparatus to receive the data pair based on a selection of the joining UI object and at least one of the plurality of selection UI objects.

16. The apparatus of claim 15, wherein the at least one processor is configured to cause the apparatus to:
determine whether the second user terminal is able to join the at least one invitation link based on user information obtained from the second user terminal; and
receive the data pair based on determining that the second user terminal is able to join the at least one invitation link and a selection of the joining UI object.

17. The apparatus of claim 12, wherein
the at least one processor is configured to cause the apparatus to disable an invitation link among the plurality of invitation links that the second user terminal is unable to join based on user information obtained from the second user terminal; and
the detail page includes the disabled invitation link.

18. The apparatus of claim 12, wherein the at least one processor is configured to cause the apparatus to:
receive modification data from the first user terminal, the modification data corresponding to the bundle invitation link;
edit the detail page based on the modification data; and
cause the display of the second user terminal to display the edited detail page in response to re-receiving, from the second user terminal, the input corresponding to the bundle invitation link.

19. The apparatus of claim 12, wherein the at least one processor is configured to cause the apparatus to:
receive modification data from the first user terminal, the modification data corresponding to the bundle invitation link;
edit the detail page based on the modification data;
generate a new bundle invitation link connected to the edited detail page;
transmit the new bundle invitation link to the second user terminal; and
cause the display of the second user terminal to display the edited detail page in response to receiving, from the second user terminal, an input corresponding to the new bundle invitation link.

* * * * *